United States Patent [19]

Spillner et al.

[11] Patent Number: 5,306,553
[45] Date of Patent: Apr. 26, 1994

[54] IMPREGNATED FLAT GASKET AND METHOD OF PRODUCING THE GASKET

[75] Inventors: Bernd Spillner, Leverkusen; Hans-Rainer Zerfass, Taunusstein-Neuhof, both of Fed. Rep. of Germany

[73] Assignee: Goetze AG, Burscheid, Fed. Rep. of Germany

[21] Appl. No.: 849,229

[22] Filed: Mar. 10, 1992

[30] Foreign Application Priority Data

Mar. 23, 1991 [DE] Fed. Rep. of Germany ........ 4109681

[51] Int. Cl.$^5$ .............................................. B32B 5/16
[52] U.S. Cl. .................................... 428/283; 428/285; 428/290; 428/457; 428/473.5; 428/474.4
[58] Field of Search ............... 428/281, 283, 290, 285, 428/457, 473.5, 474.4

[56] References Cited

U.S. PATENT DOCUMENTS

| | | | |
|---|---|---|---|
| 4,078,075 | 5/1988 | Beyer et al. | 428/221 |
| 4,271,228 | 6/1981 | Foster et al. | 428/281 |
| 4,330,442 | 5/1982 | Lindeman et al. | 524/16 |
| 4,557,969 | 12/1985 | Berbner et al. | 428/283 |
| 4,859,526 | 8/1989 | Potepan et al. | 428/283 |
| 5,098,777 | 3/1992 | Koli | 428/283 |

FOREIGN PATENT DOCUMENTS

| | | |
|---|---|---|
| 0096389 | 12/1983 | European Pat. Off. . |
| 0151302 | 8/1985 | European Pat. Off. . |
| 0166376 | 1/1986 | European Pat. Off. . |
| 2304592 | 8/1974 | Fed. Rep. of Germany . |

Primary Examiner—George F. Lesmes
Assistant Examiner—Chris Raimund
Attorney, Agent, or Firm—Spencer, Frank & Schneider

[57] ABSTRACT

An impregnated flat gasket useful as a cylinder head gasket for an internal-combustion engine, includes a fiber mat comprised of from about 2 to about 20 weight percent of a synthetic organic fiber; from about 10 to about 70 weight percent of a first inorganic filler which has a grain size having a maximum of 0.01 mm and which has a specific surface area having a maximum of 30 m$^2$/g; from about 10 to about 70 weight percent of a second inorganic filler which is composed of particles having a shape which is one of needle-shaped and globular, which has a grain size having a maximum of 0.01 mm and which has a specific surface area ranging from 50 to 350 m$^2$/g; from about 0.5 to about 1 weight percent of zinc oxide; and from about 3 to about 10 weight percent of a nitrile butadiene latex. The impregnated fiber mat material can be punched into gasket blanks without problems.

15 Claims, 1 Drawing Sheet

IMPREGNATED FLAT GASKET AND METHOD OF PRODUCING THE GASKET

CROSS-REFERENCE TO RELATED APPLICATION

This application claims the priority of application Ser. No. P 41 09 681.9 filed in Germany on Mar. 23, 1991, the subject matter of which is incorporated herein by reference.

BACKGROUND OF THE INVENTION

1. Field of the Invention

The present invention relates to an impregnated flat gasket such as, in particular, a cylinder head gasket for internal-combustion engines, made of soft material fiber mats which may be reinforced with a metal reinforcing member, and to a method of producing such an impregnated flat gasket.

2. Background of the Art

A cylinder head gasket for internal-combustion engines is preferably composed of fiber mat material which is plate-shaped and which may contain asbestos or be asbestos free. A metal carrier sheet may be laminated between a pair of fiber mats for reinforcement. Primarily to improve its strength and its sealing behavior, the fiber mat material is preferably impregnated with liquid polymers that are able to undergo cross-linking. These polymers are then cross-linked in the fiber mat, preferably thermally, and by employing cross-linking agents, such as catalysts, as is known in the art. Passage openings are punched through the fiber mat, for example, for internal combustion engine members including the combustion chamber, the fluid to be cooled, the coolant, and the fastening screws. The cut edges of passage openings that are to be under high thermal stresses in use are protected by encasement within U-shaped metal borders that are bent around the edges.

Cylinder head gaskets have been produced by rolling fiber mats onto both sides of a metal carrier sheet, preferably a metal sheet provided with rough teeth, the rough teeth mechanically fastening and clamping together the fiber mats to provide a laminate. Thereafter, the gasket outline and passage openings of the cylinder head gasket blank are punched out of the resulting laminate. Only after the respective passage openings of the gasket blank have been encased in U-shaped metal borders is the finished gasket impregnated with a cross-linkable impregnating agent and then the impregnating agent is cross-linked. The prior art's technique of impregnating the encased gasket advantageously eliminates the need for punching out already impregnated material, a task characterized by a great amount of punching work and tool wear. At the same time, as described in published German Patent Application No. 2,304,592, the impregnation of the already encased gasket keeps the fiber mat material underneath the metal borders substantially free of impregnating agent so that the material there can be subjected to significantly greater pressure stresses than impregnated fiber mat material is able to withstand. Thus, such prior art gaskets can be subjected to high sealing pressures and produces the desired high sealing effect along the passage opening edges.

On the other hand, impregnation of gaskets that are already punched and provided with edge encasements is expensive and may, under the influence of various factors, result in gaskets with faulty impregnation. The cut outline edges of the gasket and the cut edges of the passage openings which are not protected by edge encasements have a greater suction capability for impregnating agent so that more impregnating agent tends to enter into the fiber material in the regions around these cut edges. Thus, density differences result in the impregnated soft material, with increased swelling behavior in the edge zones. The presence of impregnating agent in the fiber mat and its subsequent cross-linking produces swelling of the fiber mat so that the gasket must subsequently be further compressed and the borders must be leveled which is expensive.

These difficulties can be avoided if the sealing material is impregnated before the gaskets are punched out. However, it has been noted that, if prior art sealing materials are employed that are made of impregnated and metal reinforced fiber mats, the above-described drawbacks reoccur during punching and as edges are exposed. Moreover, such gaskets no longer have the required absence of impregnating agent underneath the borders.

SUMMARY OF THE INVENTION

It is therefore an object of the present invention to provide an impregnated flat gasket useful as a cylinder head gasket for an internal combustion engine and a method of producing the flat gasket with which the impregnated flat gasket can be manufactured easily and economically without the above-described drawbacks.

This object is accomplished by the present invention which provides an impregnated flat gasket whose soft material fiber mat is comprised of from about 2 to about 20 weight percent of a synthetic organic fiber; from about 10 to about 70 weight percent of a first inorganic filler which has a grain size having a maximum of 0.01 mm and which has a specific surface area having a maximum of 30 m$^2$/g; from about 10 to about 70 weight percent of a second inorganic filler which is composed of particles having a shape which is one of needle-shaped and globular, which has a grain size having a maximum of 0.01 mm, and which has a specific surface area ranging from 50 to 350 m$^2$/g; from about 0.5 to about 1 weight percent of zinc oxide; and from about 3 to about 10 weight percent of a nitrile butadiene latex.

The synthetic organic fibers preferably employed are composed of commercially available polyaramid fibers, possibly a mixture thereof with polyamidimide fibers. Preferably the synthetic organic fiber has fibers which are at least partially fibrillated, more preferably which are substantially fibrillated, and most preferably which are entirely fibrillated. Preferably the synthetic organic fibers have a fiber length ranging between about 0.5 and about 8 mm. The first inorganic filler is preferably a finely divided material selected from the group consisting of silicic acid and calcinated kaolin. The second inorganic filler is preferably a magnesium aluminum silicate of the attapulgite or sepiolite type. The nitrile butadiene latex is preferably a commercially available carboxylated nitrile butadiene latex. The zinc oxide is in powdered form and is preferably finely divided. A solid sliding agent may be employed to reduce friction and the fiber mat may thus additionally comprise from about 0.001 to about 10 weight percent of a solid sliding agent. Preferably the sliding agent is graphite powder.

The object of the invention is also accomplished by providing a method of producing an impregnated flat gasket, which includes the steps of (a) providing at least one fiber mat which has the form of a strip and which is comprised of from about 2 to about 20 weight percent of a synthetic organic fiber; from about 10 to about 70 weight percent of a first inorganic filler which has a grain size having a maximum of 0.01 mm and which has a specific surface area having a maximum of 30 m$^2$/g; from about 10 to about 70 weight percent of a second inorganic filler which is composed of particles having a shape which is one of needle-shaped and globular, which has a grain size having a maximum of 0.01 mm, and which has a specific surface area ranging from 50 to 350 m$^2$/g; from about 0.5 to about 1 weight percent of zinc oxide; and from about 3 to about 10 weight percent of a nitrile butadiene latex; (b) conducting the strip of fiber mat continuously through an impregnation bath to impregnate the fiber mat with an impregnating agent which is cross-linkable, and continuously through a cross-linking furnace to cross-link the impregnating agent and to provide a sealing material; and (c) punching a plurality of flat gaskets out of the sealing material.

The object of the invention is also accomplished by providing a method of producing an impregnated flat gasket, which includes the steps of (a) providing at least one fiber mat comprised of from about 2 to about 20 weight percent of a synthetic organic fiber; from about 10 to about 70 weight percent of a first inorganic filler which has a grain size having a maximum of 0.01 mm and which has a specific surface area having a maximum of 30 m$^2$/g; from about 10 to about 70 weight percent of a second inorganic filler which is composed of particles having a shape which is one of needle-shaped and globular, which has a grain size having a maximum of 0.01 mm, and which has a specific surface area ranging from 50 to 350 m$^2$/g; from about 0.5 to about 1 weight percent of zinc oxide; and from about 3 to about 10 weight percent of a nitrile butadiene latex; (b) punching at least one gasket blank out of the at least one fiber mat including defining a plurality of passage openings therein having sealing edges; (c) impregnating the gasket blank with an impregnating agent which is cross-linkable; (d) cross-linking the impregnating agent; and (e) encasing the sealing edges of the respective passage openings with U-shaped metal borders that are bent around the edges of the passage openings in the shape of a U.

Before step (b) in either of the above methods, the method may further comprise reinforcing the flat gasket by laminating a pair of the fiber mats between a reinforcing member which is made of metal.

DESCRIPTION OF THE PREFERRED EMBODIMENTS

Figure 1:
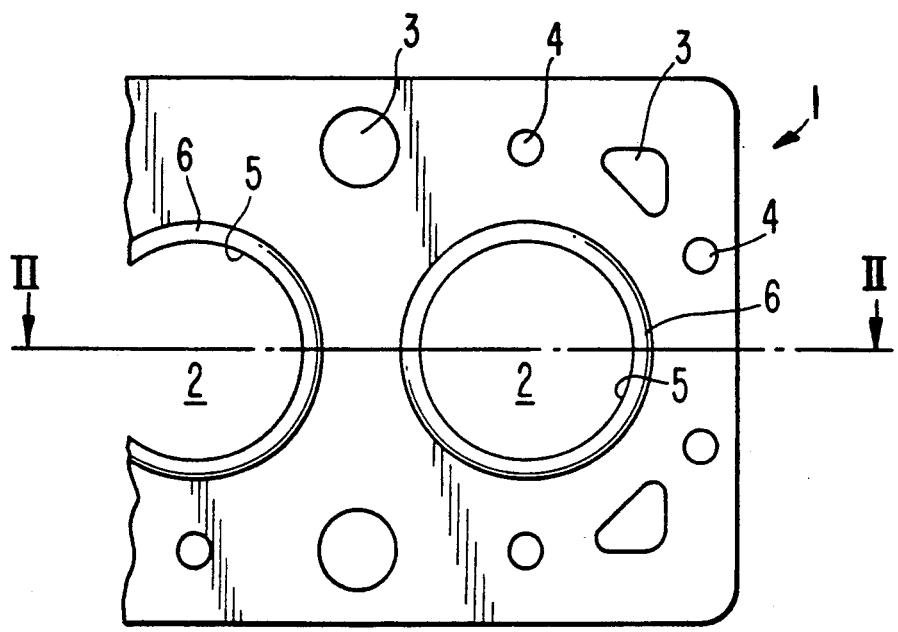
FIG. 1 is a top plan view of a portion of a cylinder head gasket according to a preferred embodiment of the invention.

FIG. 1 is a top plan view of a finished cylinder head gasket 1 provided with passage openings including combustion chamber openings 2, fluid openings 3, and screw openings 4. Combustion chamber openings 2 are encased along cut sealing edges 5 with U-shaped metal borders 6 bent around the sealing edges 5 in the shape of a U as more clearly seen in FIG. 2.

Figure 2:
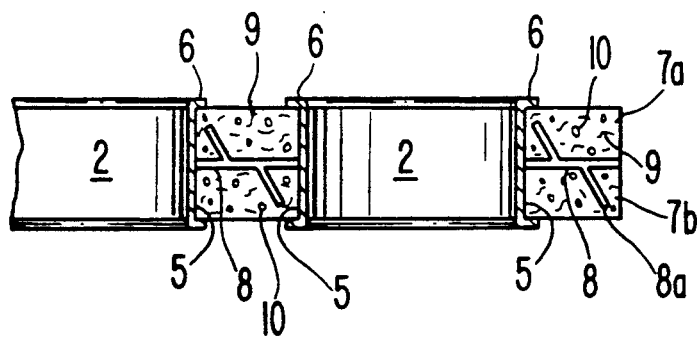
FIG. 2 is a sectional elevational view of the cylinder head gasket of FIG. 1, taken along line II—II.

FIG. 2 is a sectional elevational view of the cylinder head gasket 1 of FIG. 1, taken along lines II—II. Combustion chamber openings 2 are shown having sealing edges 5 encased by U-shaped metal borders 6. Gasket 1 includes a pair of fiber mats 7a, 7b having reinforcing member 8, which may be a metal carrier sheet 8, positioned therebetween and pressed thereinto in order to mechanically hold fiber mats 7a and 7b together. Reinforcing member 8 is made of metal in sheet form and has prongs 8a punched therethrough. Fiber mats 7a, 7b include fibrous materials 9 and particulate materials 10 both of which are preferably uniformly dispersed in the fiber mats.

Fiber mats with the composition of materials according to the present invention were produced using a paper manufacturing process and were subjected to impregnation tests. Cross-sections of the fiber mats were microscopically examined and photomicrographs showed that the components were distributed uniformly therein. Due to the use of the synthetic organic fiber as the sole type of fiber and in a relatively small quantity, the fiber mats exhibited a substantially uniform fiber lattice. The fibers did not felt together so that the fiber mats were found to be substantially free of agglomerations and irregularly distributed cavities. The cavities disposed between the fibers were, moreover, filled uniformly with densely packed filler particles. This is believed to be due to the small average diameter of the filler particles which appears to have permitted only a narrow pore distribution with a small pore radii. Further, the fiber mats had good strength values which permitted problem-free manipulation during the manufacture of gaskets therefrom in further processing stages. Finally, use of fillers having a large specific surface area was found to result in an advantageously high pressure stressability, substantially above the values obtained for conventional fiber mats employed for gaskets.

The impregnation of the fiber mat may be effected in any of the well known ways and with conventional, cross-linkable liquid polymers, preferably commercially available liquid polysiloxanes. It was found in this connection that the fine pores defined in the fiber mat were such that it was sufficient to impregnate the fiber mat to a fill factor having a maximum of about 0.5 and still obtain a sufficient cross-sectional density of the material. Advantageously, then, because such a relatively small quantity of impregnating agent was employed, good pressure resistance remained after the impregnation process. Thus, the impregnated fiber mats according to the invention could be subject to the same high sealing pressures as non-impregnated fiber mats or mats having non-impregnated zones and good sealing results could be obtained with impregnated material.

It was found to be expedient, if impregnating agents are employed that cross-link by way of cross-linking agents which are solids, to add these cross-linking agents directly to the fiber mat and preferably in a finely divided form which is uniformly distributed. Then, the cross-linking of the impregnating agent is optimally uniform. For the preferably-employed impregnating agents, polysiloxanes, the fiber mat preferably contains between about 2 and about 4 weight percent of finely divided, uniformly distributed zinc stearate as catalyst. Use of zinc stearate is based on the selection of polysiloxanes as the impregnating agent employed, however, other suitable impregnating agent and cross-linking agent combinations may be used as are known in the art.

Punching tests were additionally conducted on laminated gasket blanks made of fiber mats of a composition according to the invention which were pressed onto both sides of a reinforcing member, i.e., a carrier plate which was a rough-toothed metal sheet having prongs punched therethrough, and impregnated. The punching work corresponded approximately to that required for a corresponding non-impregnated laminated gasket blank made of non-impregnated fiber mats. Thus, it was possible to punch the gaskets out of the gasket blank sealing material according to the present invention without problems and without greater tool wear due to impregnation. If necessary, however, a solid sliding agent composed of preferably up to about 10 weight percent graphite may be included in the fiber mat in order to further facilitate the punching work by reducing friction. Tests confirmed that the functional behavior of the fiber mat, particularly its pressure resistance, was not worsened by the addition of graphite as a sliding agent.

Employing the fiber mat material according to the present invention, it is now possible to punch flat gaskets out of impregnated, gasket blank sealing material without problems and to process them further into properly operating gaskets. In this connection, it is particularly advantageous that the present invention enables manufacture of the gaskets substantially fully automatically in a continuously operating process. For this purpose, the process starting materials are rolls of fiber mat material in strip from and metal carrier material, preferably a sheet or strip of rough-toothed metal, which, after the fiber mat material has been laminated thereon by being rolled onto both of its sides, can be conducted as a continuous band through an impregnating agent bath and then through a cross-linking furnace. The gaskets can then be punched out directly from the resulting impregnated gasket blank laminate and can be processed into finished gaskets that are ready for use. Alternatively, the fiber mat material may be initially impregnated and the impregnating agent cross-linked in a furnace in a continuous process, and then it may be laminated with the metal carrier material.

It is just as advantageous and is within the scope of the invention to punch the gaskets out of the fiber mat material after it has been combined with the metal carrier material. Then, after subsequent impregnation, gaskets may be manufactured by providing the sealing edges of respective passage openings with metal borders to encase the sealing edges. The flat gaskets according to the invention before sealing edge encasement are uniformly thick and have absorbed the impregnating agent uniformly. Thus, wetting anomalies by the impregnating agent in exposed edge regions are impossible. Moreover, leveling of the border with a defined edge overhang into the soft material of the fiber mat that has been swelled by the impregnation process is accomplished with only a low expenditure of force.

The continuous impregnation process that can be employed for the flat gasket material according to the present invention permits the easy manufacture of flat gaskets in an economically advantageous manner and with high productivity. The resulting flat gaskets exhibit uniform impregnation because of uniform impregnating agent absorption and, simultaneously, good operational behavior permitting high sealing pressure stresses and correspondingly optimum sealing behavior. Gaskets can then be finished from the punched gasket blanks by means of conventional processing methods, such as by encasing the respective passage openings and applying layers or coatings.

There is a slight tendency for gaskets according to the invention to stick. This, however, is generally an advantage so that most of the time the non-stick coatings customarily applied by the prior art are not required.

Preferably, the fiber mat sealing material according to the present invention is employed for the production of cylinder head gaskets from internal-combustion engines. However, in principle, similarly-stressed flat gaskets can also be produced this way, particularly gaskets for engine construction, such as exhaust flange seals.

It will be understood that the above description of the present invention is susceptible to various modifications, changes and adaptations, and the same are intended to be comprehended within the meaning and range of equivalents of the appended claims.

What is claimed is:

1. An impregnated flat gasket useful as a cylinder head gasket for an internal-combustion engine, comprising:
    a fiber mat comprised of:
        from about 2 to about 20 weight percent of a synthetic organic fiber, as the sole fibrous constituent, composed of at least one polymer selected from the group consisting of a polyaramid and a polyamidimide;
        from about 10 to about 70 weight percent of a first inorganic filler which has a grain size having a maximum of 0.01 mm and which has a specific surface area having a maximum of 30 $m^2/g$;
        from about 10 to about 70 weight percent of a second inorganic filler which is composed of particles having a shape which is one of needle-shaped or globular, which has a grain size having a maximum of 0.01 mm, and which has a specific surface are ranging from 50 to 350 $m^2/g$;
        from about 0.5 to about 1 weight percent of zinc oxide; and
        from about 3 to about 10 weight percent of a nitrile butadiene latex.

2. The impregnated flat gasket as defined in claim 1, wherein the synthetic organic fiber has fibers which are at least partially fibrillated and have a fiber length ranging between about 0.5 and about 8 mm.

3. The impregnated flat gasket as defined in claim 2, wherein the first inorganic filler is a finely divided material selected from the group consisting of silicic acid and calcinated kaolin.

4. The impregnated flat gasket as defined in claim 3, wherein the second inorganic filler is a magnesium aluminum silicate selected from the group consisting of attapulgite and sepiolite.

5. The impregnated flat gasket as defined in claim 4, wherein the nitrile butadiene latex is a carboxylated nitrile butadiene latex.

6. The impregnated flat gasket as defined in claim 5, wherein the fiber mat additionally comprises from about 0.001 to about 10 weight percent of graphite powder.

7. The impregnated flat gasket as defined in claim 6, wherein the fiber mat additionally comprises from about 2 to about 4 weight percent of a cross-linking catalyst which is a solid.

8. The impregnated flat gasket as defined in claim 7, wherein the fiber mat is metal reinforced by having attached thereto a reinforcing member which is made of metal.

9. The impregnated flat gasket as defined in claim 1, wherein the first inorganic filler is a finely divided material selected from the group consisting of silicic acid and calcinated kaolin.

10. The impregnated flat gasket as defined in claim 1, wherein the second inorganic filler is a magnesium aluminum silicate selected from the group consisting of attapulgite and sepiolite.

11. The impregnated flat gasket as defined in claim 1, wherein the nitrile butadiene latex is comprised of a carboxylated nitrile butadiene latex.

12. The impregnated flat gasket as defined in claim 1, wherein the fiber mat additionally comprises from about 0.001 to about 10 weight percent of graphite powder.

13. The impregnated flat gasket as defined in claim 1, wherein the fiber mat additionally comprises from about 2 to about 4 weight percent of a cross-linking catalyst which is a solid.

14. The impregnated flat gasket as defined in claim 1, wherein the fiber mat is metal reinforced by having attached thereto a reinforcing member which is made of metal.

15. The impregnated flat gasket as defined in claim 1, wherein the fiber mat is impregnated with an impregnating agent to a fill factor having a maximum of about 0.5.

* * * * *